Oct. 15, 1968  H. E. VOLLBEHR  3,405,607

MULTI-POSITION FLUIDIC CONTROLLED ACTUATOR

Filed June 8, 1966  4 Sheets-Sheet 1

INVENTOR
HARALD E. VOLLBEHR

BY
Cauden & Cauden
HIS ATTORNEYS

Oct. 15, 1968 H. E. VOLLBEHR 3,405,607
MULTI-POSITION FLUIDIC CONTROLLED ACTUATOR
Filed June 8, 1966 4 Sheets—Sheet 3

INVENTOR
HARALD E. VOLLBEHR

BY
*Cauden & Cauden*

HIS ATTORNEYS

United States Patent Office

3,405,607
Patented Oct. 15, 1968

3,405,607
MULTI-POSITION FLUIDIC CONTROLLED
ACTUATOR
Harald E. Vollbehr, Irwin, Pa., assignor to Robertshaw
Controls Company, Richmond, Va., a corporation of
Delaware
Filed June 8, 1966, Ser. No. 556,150
16 Claims. (Cl. 91—357)

ABSTRACT OF THE DISCLOSURE

This disclosure relates to a pneumatically operated, multi-position actuator that has a plurality of passage means adapted to selectively lead from a pneumatic source to the actuating chamber of the actuator that is defined in part by a movable diaphragm, the movable diaphragm carrying a cam member that moves in unison with the diaphragm and cam movable means of each of the passage means between their passage opening positions and their passage closing positions whereby the cam member will cause the movable means of a respective passage means to close that respective passage means when the cam member reaches a predetermined position thereof relative to the passage means to terminate the pneumatic signals being imposed thereby in the actuating chamber so that the cam member will remain in its predetermined position until the fluid signal in the actuating chamber is changed.

---

This invention relates to a fluidic controlled actuator having a plurality of actuated positions therefor for positioning an actuated member in selected positions thereof.

It is well known that various multi-position fluidic controlled actuators have been provided for selectively positioning actuated members in various positions thereof by selectively controlling the fluidic signal being directed to the actuator.

It is a feature of this invention to provide such a multi-position fluidic controlled actuator wherein the parts of such actuator are relatively simple to manufacture and assemble together to provide an accurate multi-position fluidic controlled actuator having many improved features as hereinafter set forth.

Accordingly, it is an object of this invention to provide an improved multi-position fluidic controlled actuator or the like having one or more of the novel features set forth above or hereinafter shown or described.

Other objects, uses and advantages of this invention are apparent from a reading of this description which proceeds with reference to the accompanying drawings forming a part thereof and wherein.

Figure 1:
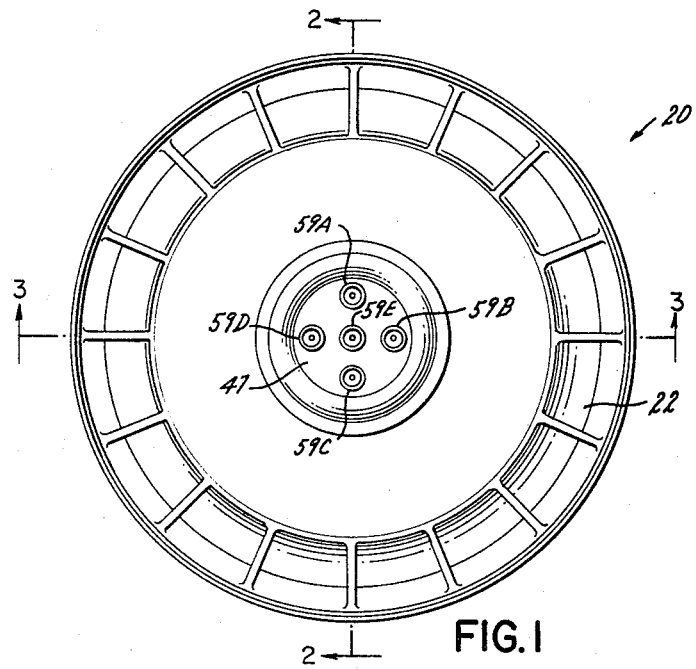
FIGURE 1 is an end view of the improved actuator of this invention.

While the various features of this invention are hereinafter described and illustrated as being particularly adaptable to provide a fluidic controlled actuator or the like, it is to be understood that the various features of this invention can be utilized singly or in any combination thereof to provide structure for other apparatus or the like.

Therefore, this invention is not to be limited to only the embodiments illustrated in the drawings, because the drawings are merely utilized to illustrate one of the wide variety of uses of this invention.

Figure 2:
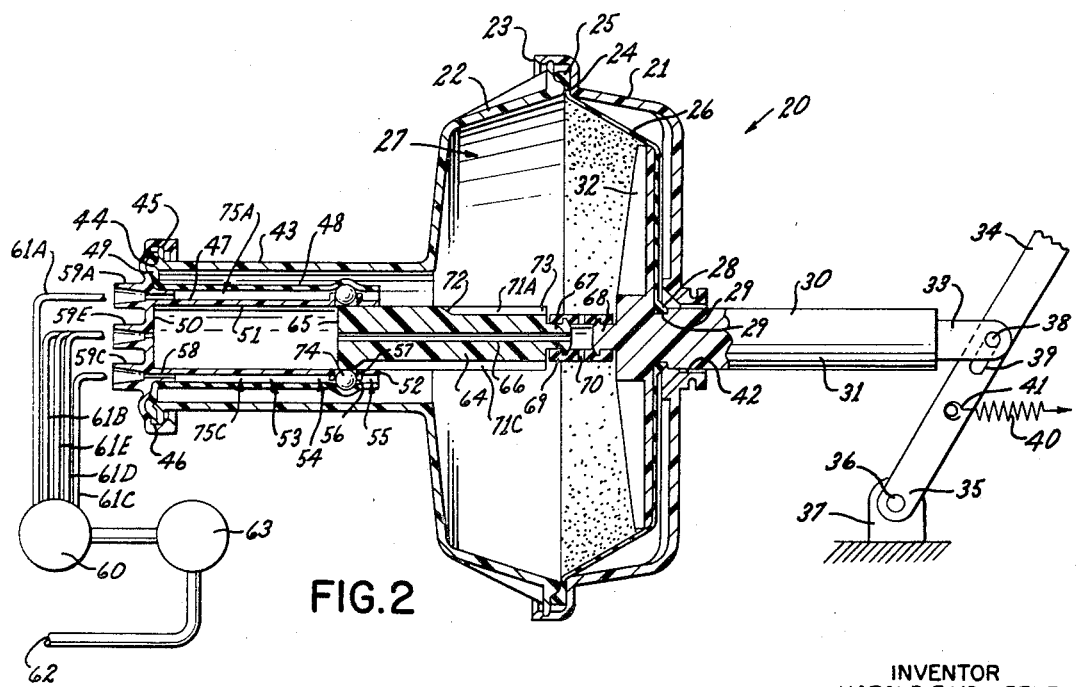
FIGURE 2 is a cross-sectional view taken on line 2—2 of FIGURE 1 and illustrates the actuator in one of its positions.

Referring now to FIGURES 1 and 2, the improved multi-position fluidic controlled actuator of this invention is generally indicated by the reference numeral 20 and comprises a pair of substantially cup-shaped housing members 21 and 22 snap fitted together at their open ends 23 and 24 to not only interconnect the housing members 21 and 22 together, but to also sealingly hold the outer periphery 25 of a flexible diaphragm 26 therebetween, the flexible diaphragm 26 cooperating with the housing member 22 to define a chamber 27 therebetween.

The flexible diaphragm 26 has its inner periphery 28 sealingly received in an annular recess 29 of a post means 30, the recess 29 being formed at the juncture of a post portion 31 of the post means 30 and a diaphragm back-up plate portion 32 of the post means 30 whereby movement of the diaphrgam 26 in a manner hereinafter described causes the post means 30 to move in unison therewith.

The post portion 31 of the post means 30 can be so constructed and arranged that the outer end 33 thereof is adapted to be interconnected to a desired actuating member 34. For example, the actuating member 34 can control the speed of spin and/or agitation of a domestic automatic washing machine or the like depending upon the pivotal portion of the actuating member 34.

In the embodiment illustrated in the drawings, the member 34 comprises a lever having one end 35 pivotally mounted by pivot pin means 36 to a stationary bracket 37 while the other end (not shown) is interconnected to the transmission means of the washing machine or the like in any suitable manner, the lever 34 being pivotally interconnected to the end 33 of the post means 31 by a pivot pin means 38 being received in an elongated slot 39 of the lever 34. A suitable tension spring 40 can be provided and have one end 41 interconnected to the lever 34 to tend to maintain the lever 34 in the position illustrated in FIGURE 2 wherein the diaphragm 26 is in its extreme right hand position against the housing member 21, the housing member 21 having a central aperture 42 for permitting telescopic movement of the post means 31 relative thereto.

The cup-shaped housing member 22 has a hollow tubular extension 43 terminating at an open end 44 thereof, the open end 44 having an outwardly directed annular rib 45 adapted to be snap fitted in an internal annular recess means 46 of an adaptor means 47 whereby the adaptor means 47 closes off the end 44 of the chamber 27.

Figure 4:
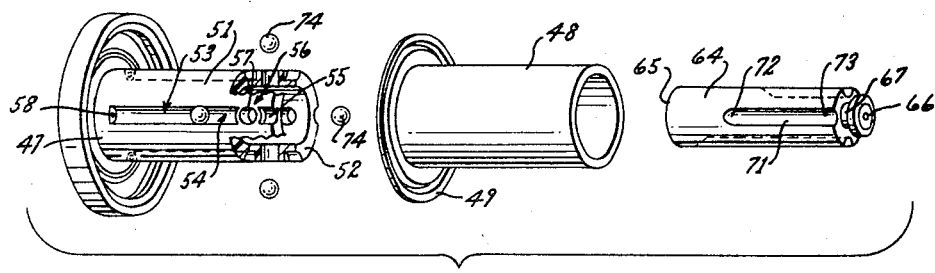
FIGURE 4 is an exploded perspective view, partially broken away, illustrating certain parts of the actuator of FIGURE 2.
Figure 5:
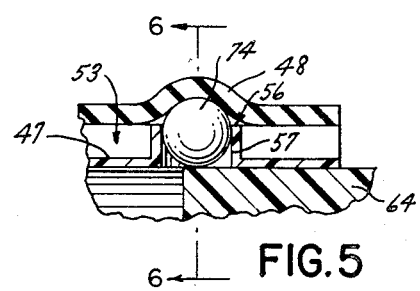
FIGURE 5 is an enlarged, fragmentary, cross-sectional view of part of the actuator of FIGURE 2.
Figure 6:
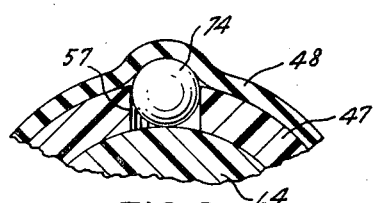
FIGURE 6 is a fragmentary, cross-sectional view taken on line 6—6 of FIGURE 5.

As illustrated in FIGURES 2 and 4, a resilient tubular sealing member 48 is provided and has an outwardly directed annular disc-like portion 49 adapted to be compressed and sealed between the end 44 of the cup-shaped member 22 and the closed end 50 of the adaptor 47 whereby the compressed disc end 49 of the resilient sealing member 48 completely seals closed the chamber 27 at the adaptor end 50.

The adaptor 47 has a hollow tubular portion 51 extending centrally from the inside surface of the end 50 thereof and terminates at an open end 52 thereof, the tubular portion 51 having a plurality of longitudinally disposed and spaced groove means 53 formed in the outer peripheral surface thereof.

Each groove means 53 has a left hand part 54 separated from a right hand part 55 by an ungrooved portion 56 of the tubular part 51, the ungrooved portion 56 having a circular bore 57 passing therethrough for a purpose hereinafter described.

Each left hand part 54 of the respective groove means 53 in the adaptor 47 is adapted to be fluidly interconnected to the exterior of the end 50 of the adaptor 47 by passage means 58 formed through the end 50, each passage means 58 passing through a tubular projection 59 adapted to be fluidly interconnected to a flexible conduit means or the like.

In addition, the interior of the tubular portion 51 of the adapter 57 is interconnected to the exterior of the end 50 by a like passage means 58 and tubular extension 59 formed in the center of the end 50.

In the embodiment illustrated in the drawings, the tubular extensions 59 are represented by the reference numerals 59A, 59B, 59C and 59D that respectively lead to the groove means 53 while the tubular extension for the interior of the tubular portion 51 of the adaptor 57 is indicated by the reference numeral 59E.

The tubular extension 59A–59E of the actuator 20 are illustrated schematically in the drawings as being respectively interconnected to a suitable selector valve means 60 by the respective conduit means 61A–61E, the selector means 60 being adapted to selectively interconnect the inlet 62 of a suitable vacuum source, such as a vacuum pump or the like, to any one of the conduits 61A–61E. However, the inlet 62 of the vacuum source is only interconnected to the selector valve means 60 when a program means 63 determines when the inlet 62 should be interconnected to the selector means 60 during a particular portion of a program cycle. If desired, the selector means 60 and/or program means 63 can be so constructed and arranged that after each fluidic actuation of the actuator 20 of this invention, the atmosphere is automatically interconnected to the conduit means 59E for a purpose hereinafter described.

A substantially cylindrical cam member 64 is interconnected to the back-up plate 32 of the flexible diaphragm 26 and has its left hand end 65 telescopically received in the open end 52 of the tubular portion 51 of the adaptor 47 in the manner illustrated in FIGURE 2, the cam means 64 having a passage means 66 extending longitudinally therethrough. The right hand end 67 of the cam member 64 is interconnected to a projection means 68 of the back-up plate 32 by a tubular coupling member 69 having the interior thereof suitably interconnected with the passage 66 of the cam means 64 and fluidly interconnected to the chamber 27 of the actuator 20 by a plurality of radially disposed passages 70 for a purpose hereinafter described.

The external peripheral surface of the cam means 64 is provided with spaced longitudinal raceways or cam slots 71 each having a beveled left hand cam end 72 and a right hand end 73 extending to the end 67 thereof, the cam slots 71 being alignable with the apertures 57 passing through the tubular portion 51 of the adaptor 47 for a purpose hereinafter described.

Figure 3:
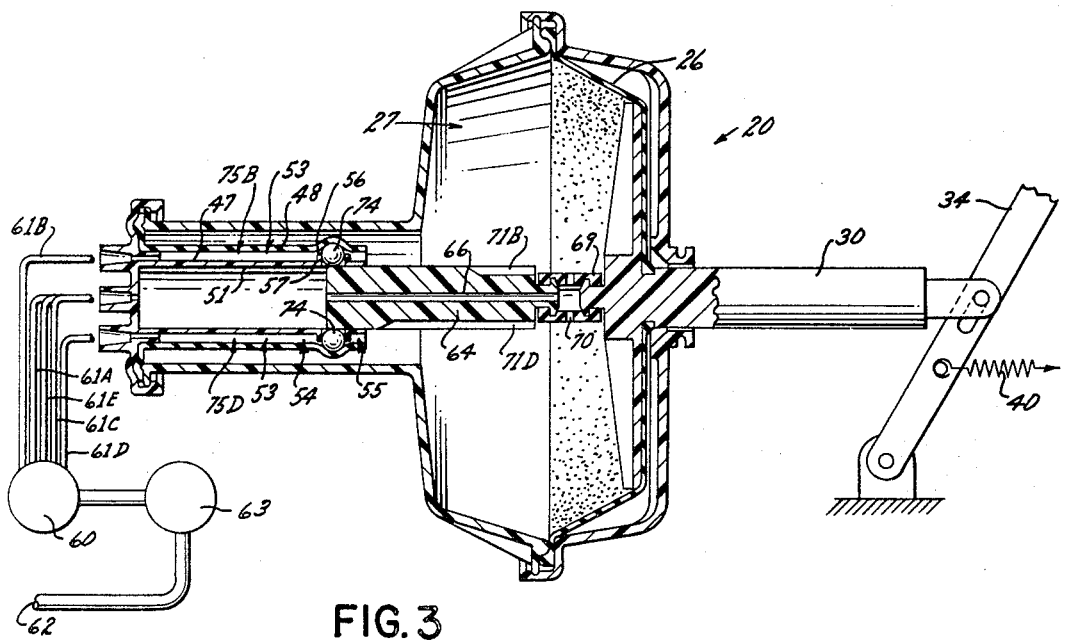
FIGURE 3 is a view similar to FIGURE 2 and is taken on line 3—3 of FIGURE 1, FIGURE 3 illustrating the actuator disposed in the same position of FIGURE 2.

The tubular portion 51 of the adaptor 47 has its outer periphery snugly received in the internal periphery of the tubular sealing member 48 in the manner illustrated in FIGURES 2 and 3 whereby the groove means 53 in the tubular portion 51 of the adaptor 47 are fluid sealed from each other by the resilient member 48. However, a metal ball 74 or the like is disposed in each bore 57 of the tubular portion 51 to engage the unslotted external peripheral surface of the cam member 64 when the diaphragm 26 is disposed in the position illustrated in FIGURES 2 and 3, each ball 74 being so constructed and arranged that the same deforms the tubular sealing member 48 outwardly away from the respective unslotted portions 56 of a particular groove means 53 so that the left hand part 54 of each groove means 53 is fluidly interconnected around its respective ball 74 to its right hand slot part 55 even though adjacent grove means 53 still remain sealed from each other by the resilient sealing member 48.

Thus, it can be seen that the tubular portion 51 and resilient sealing member 48 of the assembled actuator 20 provide fluid passages adapted to interconnect the respective conduit means 61A–61D with the chamber 27, such passages being respectively indicated by reference numerals 75A–75D with their associated balls 74 and groove means 71 of the cam means 64 being followed by the corresponding reference letter "A–D."

The operation of the actuator means 20 of this invention will now be described.

Assuming that the selector means 60 and/or program controlling means 63 is interconnecting the atmosphere to the conduit means 61E while preventing fluid communication between the inlet 62 of the vacuum source and any of the conduit means 61A–61E, air is adapted to fill the chamber 27 by passing through the interior of the tubular portion 51 of the adaptor 47, passage means 66 of the cam member 64, the interior of the tubular member 69 and out through the passage means 70 thereof whereby the force of the tension spring 40 can drawn the post means 30 and flexible diaphragm 26 of the actuator 20 to its full right hand position illustrated in FIGURES 2 and 3 to position the actuating member 34 in its extreme right hand position. With the lever 34 disposed and maintained in the position illustrated in FIGURES 2 and 3 by the tension spring 40, it can be seen that this setting of the actuator 20 will cause the actuating member 34 to provide a certain spin and/or agitation speed for the previously described washing machine or the like.

Should it be desired to select another position of the lever 34, the housewife or the like sets the selector means 60 to a desired position thereof so that when the program means 63 determines a spin or agitation cycle, the inlet 62 of the vacuum source will be interconnected to the selected conduit means 61A–61E by the selector means 60 while the selector means 60 prevents the atmosphere from entering the chamber 27 so that the actuator 20 of this invention will position the lever 34 in another speed setting position thereof than the one illustrated in FIGURES 2 and 3.

Figure 7:
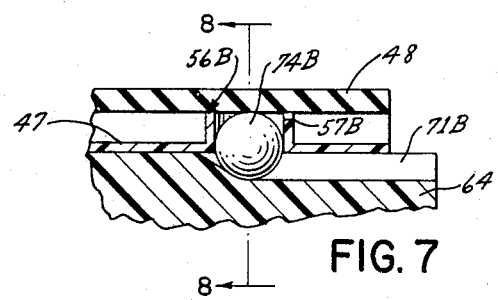
FIGURE 7 is a view similar to FIGURE 5 and illustrates the actuator in another operating position thereof.
Figure 8:
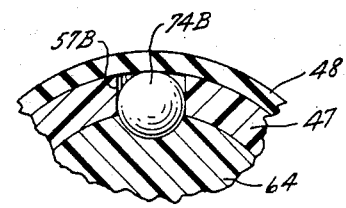
FIGURE 8 is a fragmentary, cross-sectional view taken on line 8—8 of FIGURE 7.
Figure 9:
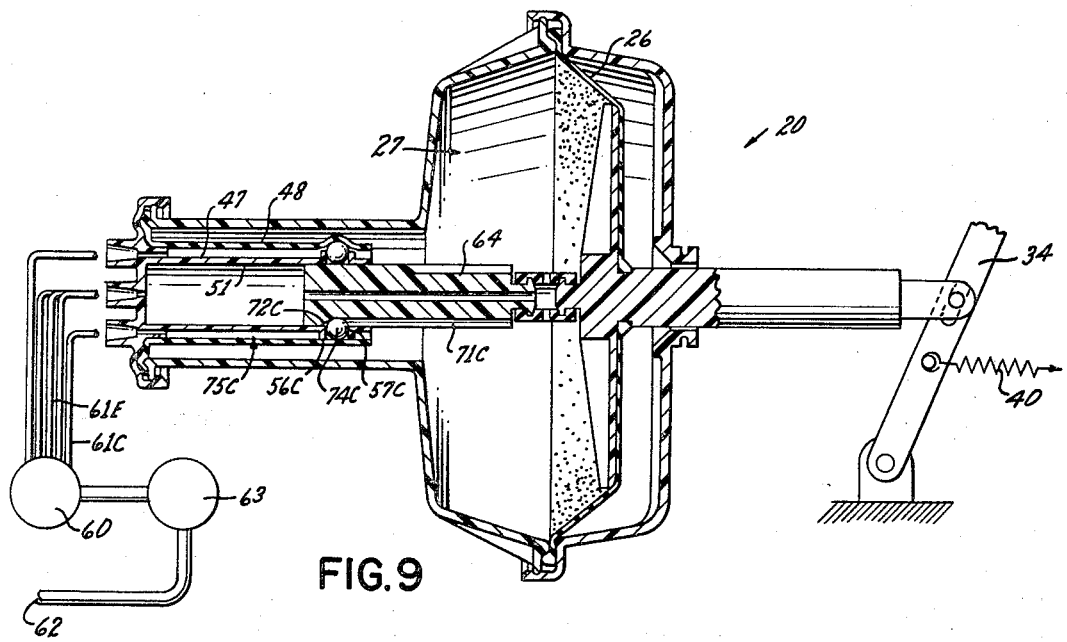
FIGURE 9 is a view similar to FIGURE 2 and illustrates the actuator in another position thereof.

For example, should the selector means 60 be set to interconnect the inlet 62 of the vacuum source to the conduit means 61C, air is adapted to be drawn from the chamber 27 through the opened passage means 75C, selector means 60 and program means 63 to the inlet 62 whereby the pressure differential acting on the flexible diaphragm 26 causes the diaphragm 26 to move to the left from the position illustrated in FIGURE 2 in opposition to the force of the tension spring 40 until the diaphragm 26 has reached the position illustrated in FIGURE 9. In particular, as the diaphragm 26 is moving from the position illustrated in FIGURE 2 to the position illustrated in FIGURE 9, the cam member 64 is further telescoped by such movement into the tubular portion 51 of the adaptor 47 until the cam slot 71C has its left hand end 72C aligned with the bore 57C. With this relative positioning of the cam means 64 with the tubular portion 51 of the adaptor 47, the natural resiliency of the sealing member 48 forces the ball 74C radially inwardly into the cam slot 71C in the manner illustrated in FIGURE 9 and seals closed against the unslotted portion 56C of the tubular portion 51 of the adaptor 47 in the manner illustrated in FIGURES 7 and 8 to prevent fluid communication between the chamber 27 and the conduit means 61C.

With the sealing member 48 now closing the passage means 75C from the chamber 27 in the manner illustrated in FIGURE 9, movement of the diaphragm 26 to the left is terminated in the position illustrated in FIGURE 9 whereby the lever 34 is now set in a new position thereof.

Subsequently, when the selector means 60 and/or program means 63 disconnects the inlet 62 of the vacuum source from the conduit 61C and permits the atmosphere to enter the conduit 61E, and, thus, to enter the chamber 27, the tension spring 40 will return the lever 34 back to the position illustrated in FIGURE 2.

Accordingly, the housewife or the like can set the selector means 60 at any particular setting thereof to cause the lever 34 to be set in one of the multiple positions thereof as determined by the actuated position of the actuator 20 of this invention.

Figure 10:
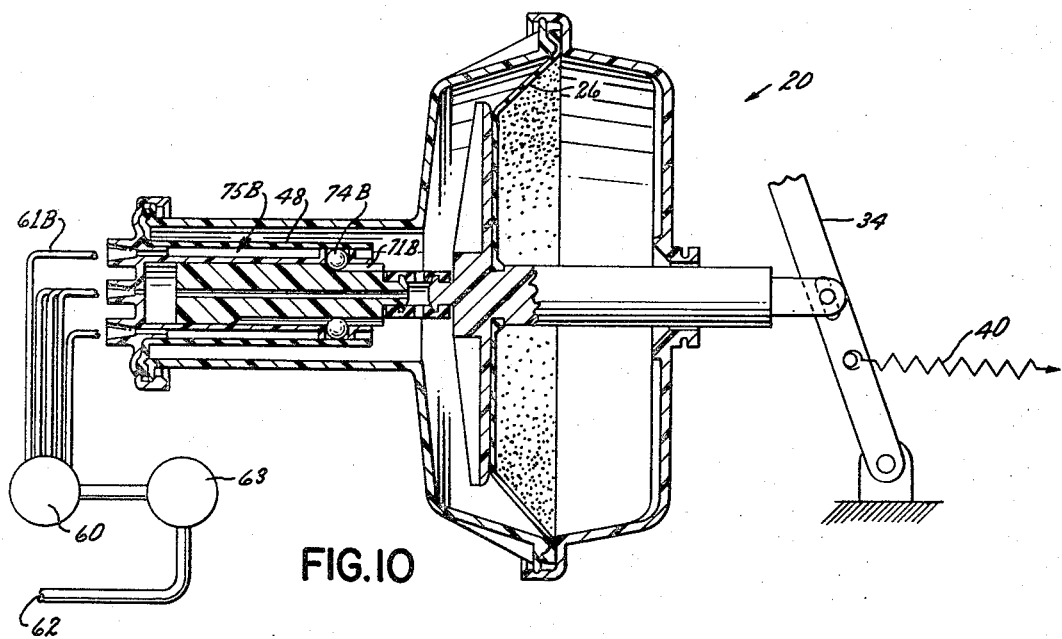
FIGURE 10 is a view similar to FIGURE 3 and illustrates the actuator in another position thereof.

For example, in FIGURE 10, the selector means 60 has been set to interconnect the inlet 62 of the vacuum source to the conduit means 61B whereby the actuator 20 has the diaphragm 26 thereof moved to the position illustrated in FIGURE 10, such position causing the ball 74B to enter its respective cam slot 71B so that the sealing member 48 will close off the passage means 75B.

Figure 11:
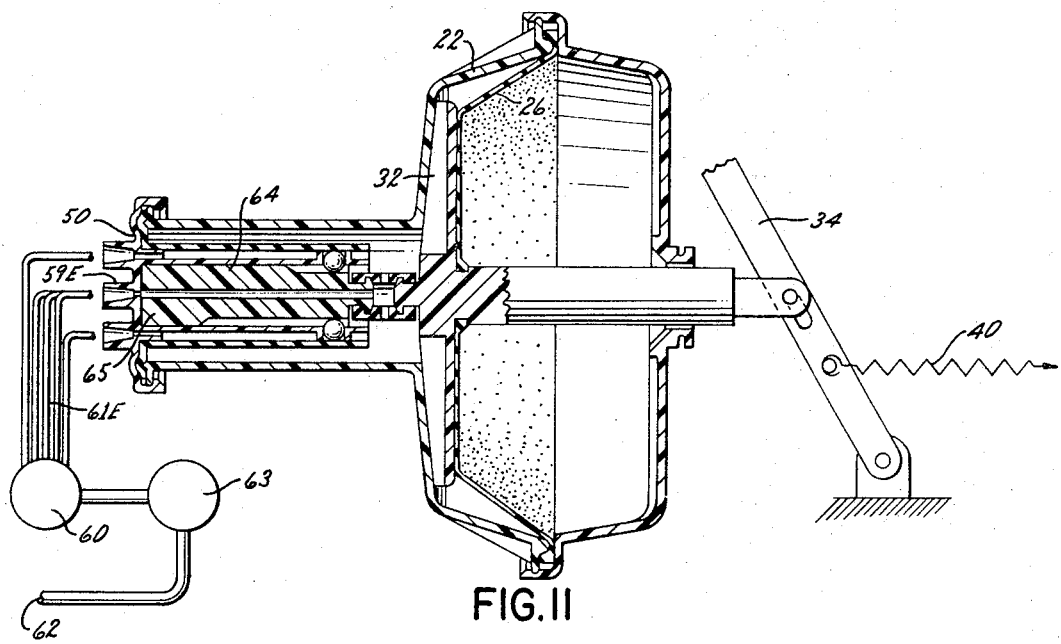
FIGURE 11 is a view similar to FIGURE 10 and illustrates the actuator in still another position thereof.

The extreme left hand position of the lever 34 is provided when the selector means 60 interconnects the inlet 62 of the vacuum source to the conduit means 59E whereby the diaphragm 26 continues to move to the left to the position illustrated in FIGURE 11, such leftward movement of the diaphragm 26 being terminated by either the back up plate 32 engaging the cup-shaped housing member 22 and/or end 65 of the cam member 64 abutting against the closed end 50 of the adaptor 47.

Accordingly, it can be seen that this invention provides a fluidic controlled multi-position actuator that can provide a relative large number of stepped settings thereof without complicated or expensive parts while still being accurate in the operation thereof.

Thus, this invention not only provides a multi-position fluidic controlled actuator or the like, but also this invention provides improved parts for such an actuator or the like.

While the form of the invention now preferred has been disclosed as required by the statutes, other forms may be used, all coming within the scope of the claims which follow.

What is claimed is:

1. A multi-position fluidic controlled actuator comprising housing means having a chamber, said housing means carrying a movable member moved by a fluidic signal being imposed in said chamber in said housing means, said housing means including a plurality of passage means for selectively interconnecting a fluidic source with said chamber of said housing means, said passage means each having movable means to be moved to one position thereof to open the respective passage means to said chamber and to be moved to another position thereof to close the respective passage means from said chamber, said member having a cam member for camming said movable means between said positions thereof whereby said cam member causes said movable means of a respective passage means to close that respective passage means when said member reaches a predetermined position thereof relative to said housing means to terminate said fluidic signal being imposed thereby in said chamber whereby said member remains in said predetermined position until said fluid signal in said chamber is changed.

2. An actuator as set forth in claim 1 wherein said movable member is carried by a flexible diaphragm, said diaphragm cooperating with said housing means to define said chamber therebetween.

3. An actuator as set forth in claim 1 and including spring means for returning said movable member to one position thereof when said fluid signal is changed.

4. An actuator as set forth in claim 1 wherein said passage means are disposed parallel with each other.

5. An actuator as set forth in claim 4 wherein said passage means are circularly arranged and said cam member is concentric therewith.

6. An actuator as set forth in claim 1 wherein said passage means are defined between a grooved member of said housing means and a flexible member of said housing means.

7. A multi-position fluidic controlled actuator comprising housing means having a chamber, said housing means carrying a movable member moved by a fluidic signal being imposed in said chamber in said housing means, said housing means including a plurality of passage means for selectively interconnecting a fluidic source with said chamber of said housing means, said member having a cam member for operatively closing a respective passage means when said member reaches a predetermined position thereof relative to said housing means to terminate said fluidic signal being imposed thereby in said chamber whereby said member remains in said predetermined position until said fluid signal in said chamber is changed, said passage means being defined between a grooved member of said housing means and a flexible member of said housing means, said cam member having means for flexing said flexible member to selectively open and close said passage means.

8. An actuator as set forth in claim 7 wherein said cam member has cam raceways alignable with the groove means of said grooved member, and a plurality of cam parts respectively cooperable with said cam raceways and said flexible member for flexing the same.

9. An actuator as set forth in claim 8 wherein said grooved member and said cam member are telescopically arranged.

10. An actuator as set forth in claim 9 wherein said flexible member and said grooved member are telescopically arranged.

11. An actuator as set forth in claim 10 wherein said cam member moves in unison with said movable member and axially moves relative to said grooved and flexible members.

12. An actuator as set forth in claim 11 wherein said grooved member includes a tubular portion having said groove means in the outer periphery thereof.

13. An actuator as set forth in claim 12 wherein said flexible member includes a tubular portion telescopically disposed around said tubular portion of said grooved member and having a natural resiliency to seal against said outer periphery thereof and fluidly seal each groove means from the other groove means.

14. An actuator as set forth in claim 13 wherein each groove means comprises two aligned sections spaced by an ungrooved portion in said peripheral surface of said grooved member.

15. An actuator as set forth in claim 14 wherein each ungrooved portion has aperture means passing therethrough and receiving one of said cam parts.

16. An actuator as set forth in claim 15 wherein each cam part comprises a ball.

References Cited

UNITED STATES PATENTS

| | | | |
|---|---|---|---|
| 2,986,125 | 5/1961 | Young et al. | 91—357 |
| 3,072,108 | 1/1963 | Cripe | 91—357 |
| 3,125,001 | 3/1964 | Cripe | 91—357 |
| 3,334,545 | 8/1967 | Houser | 91—357 |

PAUL E. MASLOUSKY, *Primary Examiner.*